(12) United States Patent
Yamazaki et al.

(10) Patent No.: US 12,160,081 B2
(45) Date of Patent: Dec. 3, 2024

(54) YAG CERAMIC JOINED BODY AND PRODUCTION METHOD THEREFOR

(71) Applicant: JX Nippon Mining & Metals Corporation, Tokyo (JP)

(72) Inventors: Yoshiki Yamazaki, Ibaraki (JP); Kazuyuki Miya, Ibaraki (JP); Masahiro Tago, Ibaraki (JP); Makoto Mikami, Ibaraki (JP)

(73) Assignee: JX ADVANCED METALS CORPORATION, Tokyo (JP)

( * ) Notice: Subject to any disclaimer, the term of this patent is extended or adjusted under 35 U.S.C. 154(b) by 134 days.

(21) Appl. No.: 17/763,451

(22) PCT Filed: Oct. 13, 2020

(86) PCT No.: PCT/JP2020/038554
§ 371 (c)(1),
(2) Date: Mar. 24, 2022

(87) PCT Pub. No.: WO2021/157135
PCT Pub. Date: Aug. 12, 2021

(65) Prior Publication Data
US 2022/0393424 A1    Dec. 8, 2022

(30) Foreign Application Priority Data

Feb. 7, 2020   (JP) ................................. 2020-019898

(51) Int. Cl.
*H01S 3/16* (2006.01)
*H01S 3/06* (2006.01)

(52) U.S. Cl.
CPC .......... *H01S 3/1643* (2013.01); *H01S 3/0606* (2013.01); *H01S 3/0612* (2013.01);
(Continued)

(58) Field of Classification Search
CPC .... H01S 3/1643; H01S 3/0606; H01S 3/0617; H01S 3/0612; H01S 3/0625
See application file for complete search history.

(56) References Cited

U.S. PATENT DOCUMENTS

| | | | |
|---|---|---|---|
| 4,507,787 A * | 3/1985 | Daly .................. | H01S 3/07 |
| | | | 372/66 |
| 4,509,175 A | 4/1985 | Daly et al. | |

(Continued)

FOREIGN PATENT DOCUMENTS

| | | |
|---|---|---|
| JP | S62-226838 A | 10/1987 |
| JP | 2004-349701 A | 12/2004 |

(Continued)

OTHER PUBLICATIONS

Akio Ikesue et al., "Ceramic Laser Materials", Nature Photonics, vol. 2, pp. 721-727, Dec. 2008.

(Continued)

*Primary Examiner* — Joshua King
(74) *Attorney, Agent, or Firm* — HOWSON & HOWSON, LLC

(57) ABSTRACT

A YAG ceramic bonded body in which a YAG ceramic and a YAG ceramic or optical glass are bonded, wherein the YAG ceramic bonded body comprises glass as a bonding layer, and has a rate of change of transmittance that is within 7%. An object of this invention is to provide a bonded body in which a YAG ceramic and a YAG ceramic are bonded, or a bonded body in which a YAG ceramic and optical glass are bonded, and which is capable of suppressing the reflection of light at the bonded interface, as well as the production method thereof.

12 Claims, 2 Drawing Sheets

(52) U.S. Cl.
CPC .......... *H01S 3/0617* (2013.01); *H01S 3/0619* (2013.01); *H01S 3/0625* (2013.01); *H01S 3/1685* (2013.01)

(56) References Cited

U.S. PATENT DOCUMENTS

| | | | | |
|---|---|---|---|---|
| 5,441,803 | A | * | 8/1995 | Meissner .............. H01S 3/0625 156/60 |
| 5,846,638 | A | * | 12/1998 | Meissner ................ B32B 37/00 438/455 |
| 6,650,670 | B1 | * | 11/2003 | Shimoji .................... H01S 3/16 372/39 |
| 6,810,060 | B2 | * | 10/2004 | Vetrovec .............. H01S 3/0604 372/66 |
| 7,200,161 | B2 | | 4/2007 | Vetrovec |
| 7,894,496 | B2 | * | 2/2011 | Hackel .................. H01S 3/0602 372/66 |
| 9,337,609 | B2 | * | 5/2016 | Akino ..................... H01S 3/067 |
| 11,225,439 | B2 | | 1/2022 | Mikami et al. |
| 2004/0013151 | A1 | * | 1/2004 | Sumida ................. H01S 3/0606 372/36 |
| 2004/0233960 | A1 | * | 11/2004 | Vetrovec .............. H01S 3/0941 372/67 |
| 2005/0254536 | A1 | * | 11/2005 | Hackel .................. H01S 3/0602 372/39 |
| 2006/0227829 | A1 | * | 10/2006 | Ushinsky .............. H01S 3/0602 372/39 |
| 2011/0176566 | A1 | * | 7/2011 | Tsunekane ............ H01S 3/0941 372/75 |
| 2012/0327962 | A1 | * | 12/2012 | Stultz .................. H01S 3/09403 372/45.01 |
| 2014/0307305 | A1 | * | 10/2014 | Deri ...................... H01S 3/0404 359/342 |
| 2018/0090904 | A1 | * | 3/2018 | Carré .................... H01S 3/0602 |
| 2021/0163310 | A1 | | 6/2021 | Makoto et al. |
| 2021/0336408 | A1 | * | 10/2021 | Yamazaki ............. H01S 3/0617 |

FOREIGN PATENT DOCUMENTS

| | | | | |
|---|---|---|---|---|
| JP | 2014-519721 | A | 8/2014 | |
| WO | WO-2005091447 | A1 | * 9/2005 | ........... H01S 3/0632 |

OTHER PUBLICATIONS

Robert M. Yamamoto et al., "The Use of Large Transparent Ceramics in a High Powered, Diode Pumped Solid State Laser," Advanced Solid-State Photonics, OSA Technical Digest Series (CD) (Optical Society of America), paper WC5, 2008 (month unknown).

S. Banerjee et al., "High-efficiency 10 J diode pumped cryogenic gas cooled Yb:YAG multislab amplifier", Optics Letters, vol. 37, Issue 12, pp. 2175-2177, Jun. 2012.

International Search Report and Written Opinion of the International Searching Authority issued on Dec. 15, 2020 for International PCT Patent Application No. PCT/JP2020/038554.

European Search Report issued in corresponding EP Patent Application No. 20917282.4 on Oct. 6, 2023.

\* cited by examiner

YAG CERAMIC JOINED BODY AND PRODUCTION METHOD THEREFOR

TECHNICAL FIELD

The present invention generally relates to a YAG (yttrium-aluminum-garnet) ceramic bonded body, and particularly relates to a YAG ceramic bonded body in which glass is interposed as a bonding layer as well as to the production method thereof.

BACKGROUND ART

A standard laser is an application which excites a laser medium, which is a phosphor, and optically amplifies the laser medium in a resonator which is sandwiched with optically opposing high reflectance mirrors. As a representative example of a high-power laser medium, YAG ceramics are used. Moreover, other than cases where a laser medium itself becomes the oscillation source, there is also an application as an amplifier which amplifies the laser beam output generated from a separate medium.

Properties of a YAG ceramic change considerably when doped with a dopant such as Nd, Sm, Yb, or Cr. As an amplifier, the development of light-absorbing layer YAG polycrystals in which the circumference of the Nd:YAG polycrystalline material is doped with Sm has been reported (Non-Patent Documents 1, 2). Moreover, high-power operation has been confirmed by bonding a Cr-doped polycrystalline body to a Yb:YAG laser polycrystalline body having superior energy storage (Non-Patent Document 3).

The YAG ceramics are exclusively used for a high-power laser, and demanded is a technology for bonding a YAG ceramic of different dopants and light-absorbing optical glass, as a light-absorbing layer for preventing parasitic oscillation, to a YAG ceramic of the laser oscillation part. Moreover, there are also demands for large-diameter transparent YAG ceramics, and required is a technology for bonding a YAG ceramic and a YAG ceramic, or bonding a YAG ceramic and light-absorbing optical glass, for satisfying the foregoing demands.

PRIOR ART DOCUMENTS

Patent Documents

[Patent Document 1] Japanese Unexamined Patent Application Publication (Translation of PCT Application) No. 2014-519721

Non-Patent Documents

[Non-Patent Document 1] A. Ikesue, Y. L. Aung, Nature Photonics 2, 721-727 (2008)
[Non-Patent Document 2] Yamamoto, R. M. et al., Roc, Adv. Solid State Photon, Nara, Japan WC5 (2008)
[Non-Patent Document 3] S. Banerjee, et al., Opt. Lett. 37, 2175-2177 (2012)

SUMMARY OF THE INVENTION

Problems to be Solved by the Invention

The present invention was devised in view of the foregoing circumstances, and an object of this invention is to provide a bonded body in which a YAG ceramic and a YAG ceramic are bonded, or a bonded body in which a YAG ceramic and optical glass are bonded, and which is capable of suppressing the reflection of light at the bonded interface, as well as the production method thereof.

Means for Solving the Problems

In order to achieve the foregoing object, an embodiment of the present invention is a YAG ceramic bonded body in which a YAG ceramic and a YAG ceramic or optical glass are bonded, wherein the YAG ceramic bonded body comprises glass as a bonding layer and has a rate of change of transmittance that is within 7%.

Effect of the Invention

According to the present invention, it is possible to yield a superior effect of providing a bonded body of a YAG ceramic and a YAG ceramic, or a bonded body of a YAG ceramic and optical glass, in which the reflection of light at the bonded interface is suppressed.

BEST MODE FOR CARRYING OUT THE INVENTION

Figure 1:
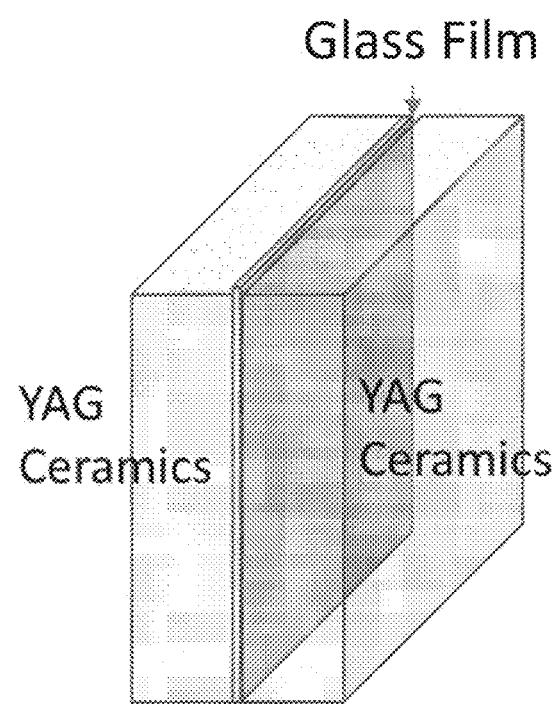
FIG. 1 is a schematic diagram of the YAG ceramic bonded body according to an embodiment of the present invention.

The bonding of a ceramic and a ceramic has been reported in the past, and this performed by flattening the surfaces to be bonded, applying pressure while applying temperature, and diffusion-bonding the ceramics based on their atomic diffusion. In this diffusion bonding, the surfaces to be bonded are polished into a mirror surface, and the temperature is increased in a state where the surfaces to be bonded are in contact so as to attain a diffusible state. Nevertheless, since the treatment based on diffusion bonding needs to be performed in a furnace of several hundred degrees to one thousand and several hundred degrees, positioning and sophisticated temperature control giving consideration to the thermal expansion of the ceramics are required, and it was difficult to perform bonding with in-plane uniformity. Furthermore, the foregoing treatment becomes even more difficult when the bonded surface area is increased.

In recent years, as another method of bonding a ceramic and a ceramic, the normal temperature bonding method has been reported. In normal temperature bonding, the object to be bonded is placed in a vacuum chamber, and the contact surface is irradiated with an atom beam or an ion beam such as an Ar beam. On the irradiated surface, the surface bond of the elements will become exposed, and, as a result of causing the surfaces to be bonded to contact each other, a strong bond can thereby be created even at normal temperature without elemental diffusion. Nevertheless, the flatness of the surfaces that can be bonded needs to be increased to an atomic layer level (Ra=order of sub nm to several nm), and while a successful ceramic sample of roughly several cm×cm has been reported, since a size that is any larger will be limited to a high grinding accuracy, there is a problem in that the processing cost becomes high.

Furthermore, also known is a bonding method using an optical adhesive (Patent Document 1). Nevertheless, an optical adhesive generally has a high coefficient of thermal expansion, and there is a problem in that the strain will increase when the temperature is changed. Moreover, since the main component of the adhesive is an organic material, there is a problem in that the heat resistance (cold resistance) properties are inferior. In particular, when used for laser applications, since it will be under an environment that is exposed to intense light, there is also a problem in that the heat resistance (cold resistance) properties and light resistance properties of organic skeletal components will deteriorate. Furthermore, while nanoparticles are also sometimes included in the adhesive in order to adjust the refractive index, there is concern that the bonding strength may deteriorate depending on the amount of nanoparticles that is included.

As explained above, it is extremely difficult to bond together ceramics having high transparency and high density (for example, relative density of 99.99% or higher) as represented by laser ceramics, or bond such a ceramic with another optical material. Previously, since optical ceramics (YAG ceramics, etc.) and other optical materials (optical glass, etc.) required transparency, bonding with high bonding strength while maintaining the bonded interface in a favorable state was demanded. With diffusion bonding using the surface diffusion of both materials and with adhesive bonding, it is difficult to prepare a bonded body having transparency and resistance properties, and a fundamental solution for realizing uniform bonding at a mass production level has been desired.

Thus, the present inventors took particular note of bonding using a glass material. Since glass is a material having considerable formativeness; that is, combined properties of a solid nature having elasticity at room temperature and a liquid nature having fluidity when the temperature is increased, it is a material with a broad range of material formation. The present invention is characterized in using this kind of glass as a bonding layer, and having prepared a bonded body of a YAG ceramic and a YAG ceramic, or a bonded body of a YAG ceramic and another optical material (optical glass). A YAG ceramic bonded body which uses glass as the bonding layer has high transmittance and suppressed light reflection at the bonded interface, and is extremely useful in laser applications.

The ceramic bonded body according to this embodiment is a YAG ceramic bonded body in which a YAG ceramic and a YAG ceramic or optical glass are bonded, wherein the YAG ceramic bonded body comprises glass as a bonding layer, and has a rate of change of transmittance that is within 7%. Preferably, the rate of change is within 5%, and more preferably the rate of change is within 3%. Here, the rate of change of transmittance is calculated based on the following formula by causing light (laser diode) having a wavelength of 650 nm to enter a YAG ceramic base material (before bonding) and the YAG ceramic bonded body (after bonding), and measuring the transmittance thereof.

Rate of change of transmittance={(transmittance of base material)−(transmittance of bonded body)}/(transmittance of base material)×100

When the rate of change of transmittance is within 7%, it could be said that the reflection of light has been sufficiently suppressed at the bonded interface, and the ceramic bonded body can be used in laser applications.

Moreover, in an embodiment of the present invention, as the glass to be used as a bonding layer, preferably used is a glass material having a refractive index of 1.71 to 1.91 relative to light having a wavelength of 650 nm. While this also depends on the type of dopant, the refractive index of a YAG ceramic, which is the object to be bonded, is roughly 1.83, and, since optical glass used for suppressing parasitic oscillation has a refractive index that is equivalent to that of the YAG ceramic as the laser medium, by using a glass material having an equivalent refractive index (1.71 to 1.91:wavelength of 650 nm), yielded is a superior effect of being able to suppress the reflection of light and attain high transmittance at the bonded interface in the YAG ceramic bonded body.

Glass as a bonding layer is a transparent material having silicate as its main component, and used may be, for example, an alkalisilicate-based glass material, aluminosilicate-based glass, borosilicate-based glass, germanosilicate-based glass, lead-based glass, and bismuth borate-based glass. Moreover, when giving consideration to the bonding process, while it is preferable to use glass having a low melting point (melting point: 1500° C. or less), even if the melting point is high, there will be no problem so as long as the refractive index is a value that is close to that of the YAG ceramic or optical glass. Moreover, it is possible to use a material in which a part or all of the glass material is crystallized.

(YAG Ceramic)

A YAG ceramic is a bulk material in which a dopant (Nd, Yb, Cr, Sm, Er or the like) for laser oscillation or light absorption is added to a polycrystalline body having $Y_3Al_5O_{12}$ as the matrix. Moreover, there is no absorption by the doped element, and the transmittance from the visible light region (wavelength of 380 nm to 760 nm) to the vicinity of the infrared region (upper limit is wavelength of 3000 nm) is 80% or higher. While the refractive index of a YAG ceramic may slightly change depending on the type of dopant, it is roughly 1.83 relative to light having a wavelength of 650 nm. In order to obtain a high-density body, it is preferable to use a material having few residual pores in the bulk, and an additive-free YAG ceramic may also be used depending on the purpose.

(Optical Glass)

Optical glass absorbs light oscillated from a YAG ceramic, and can be used as a light-absorbing layer (clad) for reducing parasitic oscillation. Optical glass has a refractive index (refractive index relative to light having a wavelength of 650 nm is 1.71 to 1.91) and a coefficient of thermal expansion (7 to 9 ppm/K) equivalent to that of a YAG ceramic forming a laser medium (core), and preferably used is a material having light absorption at a YAG oscillation wavelength (wavelength of 1030 nm, 1064 nm).

Next, an example of the production method of a YAG ceramic bonded body according to an embodiment of the present invention and an application example of the YAG ceramic bonded body are explained.

In order to bond a YAG ceramic and a YAG ceramic or optical glass, melted glass (adhesive glass) is coated on a surface of one YAG ceramic, another YAG ceramic or optical glass is bonded to the coated surface, and, by thereafter performing slow cooling, it is possible to prepare a YAG ceramic bonded body in which glass is interposed as a bonding layer as shown in FIG. 1. Moreover, by using a material (such as titanosilicate glass) having the same quality as optical glass as the adhesive glass, it is possible to prepare a bonded body substantially composed of YAG ceramic/optical glass.

A YAG ceramic bonded body that is bonded via glass as a bonding layer can be used, for example, in the following laser applications.

Figure 2:
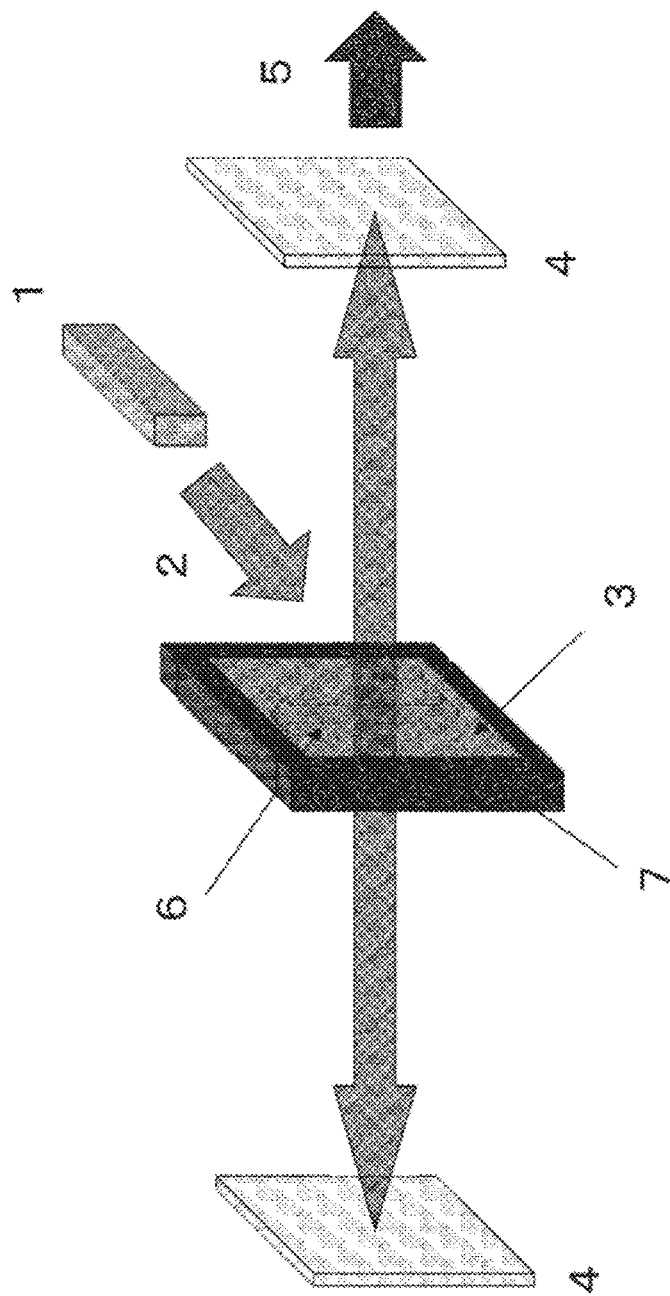
FIG. 2 is a schematic diagram of the standard laser application.

A schematic diagram of a standard laser application is shown in FIG. 2. A laser medium 3 (Yb:YAG ceramic or the like), which is a phosphor, is excited with excitation light 2 of a laser diode 1, optically amplified in a resonator sandwiched with opposing high reflective mirrors 4, 4', and thereafter emitted as a laser 5. Here, an end face of the laser medium 3 becomes the reflecting surface, and parasitic oscillation 6, which laser-oscillates in a direction that differs from the surface formed with the mirrors 4, 4', is generated. When this parasitic oscillation 6 occurs, since the output will be lower than the original laser beam expected from the resonator configured from the opposing mirrors 4, 4', the parasitic oscillation 6 needs to be reduced.

In order to reduce this parasitic oscillation 6, formed is a light-absorbing layer 7 which has an equivalent refractive index around the laser medium and which absorbs light at an oscillation wavelength range of the laser medium. By bonding a Cr:YAG ceramic doped with a transition metal such as Cr as the light-absorbing layer 7, the parasitic oscillation 6 can be prevented. Moreover, the Applicant has previously proposed using, as the light-absorbing layer, glass (optical glass) having an absorption coefficient of 0.1 to 10.0 $cm^{-1}$, a refractive index difference with the laser medium that is within ±0.1, and a linear thermal expansion coefficient difference with the laser medium is within t1 ppm/K (Japanese Patent Application No. 2019-002307).

material (LX-57B: manufactured by Nippon Electric Glass Co., Ltd.) was prepared as a bonding layer. The glass material was melted at 1000° C., the melted glass was coated on a surface of one YAG ceramic, thereafter bonded to the other YAG ceramic, and a YAG ceramic bonded body was thereby prepared.

Note that the refractive index of the Yb:YAG ceramic is 1.83 relative to light having a wavelength of 650 nm, and the refractive index of the glass material of the bonding layer is 1.71 relative to the foregoing wavelength. Moreover, the coefficient of thermal expansion of a Yb:YAG ceramic is 8 ppm/K, and the coefficient of thermal expansion of a glass material is 8 ppm/K.

A laser beam (wavelength: 650 nm) was caused to enter a YAG ceramic base material (before bonding) and the obtained YAG ceramic bonded body (after bonding), respectively, and the transmittance before and after bonding was measured and compared. As a result, the rate of change was 7%, and suppression of light reflection at the bonded interface was confirmed. Moreover, it was confirmed that no separation or cracks occurred even in a high-temperature environment of 600° C., which is the glass transition point of the bonded body, and even in a low-temperature environment such as the liquid nitrogen temperature.

TABLE 1

(Example 1) YAG Ceramic/Bonding Glass/YAG Ceramic

| | Refractive Index (wavelength of 650 nm) | Coefficient of Thermal Expansion (ppm/K) | Rate of Change of Transmittance (Transmittance of Bonded Body/Transmittance of Matrix) | Low Temperature Resistance of Bonded Body (Liquid Nitrogen Temperature) | High Temperature Resistance of Bonded Body (temperature of 600° C.) |
|---|---|---|---|---|---|
| YAG Ceramic (Matrix) | 1.83 | 8 | | | |
| Bonding Glass | 1.71 | 8 | | | |
| Bonded Body (YAG Ceramic/Bonding Glass/YAG Ceramic) | | | 7% | No separation or crack | No separation or crack |

In the bond of a Yb:YAG ceramic as the laser medium and a Cr:YAG ceramic or optical glass as the light-absorbing layer, it is possible to apply the bonded body of a YAG ceramic and a YAG ceramic or a bonded body of a YAG ceramic and another optical material (optical glass) using the glass according to the present invention as the bonding layer. Note that, while a bond of a YAG ceramic as the laser medium and a YAG ceramic or optical glass as the light-absorbing layer was explained above, the present invention can be applied even when bonding multiple YAG ceramics of the same quality via a glass bonding layer for a purpose other than a bond with the light-absorbing layer; for example, a purpose for increasing the diameter of the YAG ceramic as the laser medium.

EXAMPLES

The present invention is now explained with reference to the Examples and Comparative Examples. Note that these Examples are merely illustrative, and the present invention shall in no way be limited thereby. In other words, various modifications and other embodiments are covered by the present invention, and the present invention is limited only by the scope of its claims.

Example 1

As a YAG ceramic, two sheets of 0.5 at % Yb:YAG (2 cm×1 cm, thickness of 5 mm) were prepared, and a glass Example 2

As a YAG ceramic, 0.5 at % Yb:YAG (2 cm×1 cm, thickness of 5 mm) and titanosilicate-based glass (optical glass: 2 cm×1 cm, thickness of 5 mm) were prepared, and a glass material that is the same as the optical glass was prepared as a bonding layer. The glass material was melted at 1250° C., the melted glass was coated on a surface of a YAG ceramic, thereafter bonded to the optical glass, and a YAG ceramic bonded body was thereby prepared. Note that the refractive index of optical glass is 1.81 relative to light having a wavelength of 650 nm, and the coefficient of thermal expansion is 7 ppm/K.

A laser beam (wavelength: 650 nm) was caused to enter a YAG ceramic base material (before bonding) and the obtained YAG ceramic bonded body (after bonding), respectively, and the transmittance before and after bonding was compared. As a result, the rate of change was 1.5%, and suppression of light reflection at the bonded interface was confirmed. Moreover, it was confirmed that no separation or cracks occurred even in a high-temperature environment of 700° C., which is the glass transition point of the bonded body, and even in a low-temperature environment such as the liquid nitrogen temperature.

TABLE 2

| (Example 2) YAG Ceramic/Optical Glass | | | | | |
|---|---|---|---|---|---|
| | Refractive Index (wavelength of 650 nm) | Coefficient of Thermal Expansion (ppm/K) | Rate of Change of Transmittance (Transmittance of Bonded Body/Transmittance of Matrix) | Low Temperature Resistance of Bonded Body (Liquid Nitrogen Temperature) | High Temperature Resistance of Bonded Body (temperature of 700° C.) |
| YAG Ceramic (Matrix) | 1.83 | 8 | | | |
| Optical Glass (Titanosilicate Glass) | 1.81 | 9 | | | |
| Bonded Body (YAG Ceramic/ Optical Glass) | | | 1.5% | No separation or crack | No separation or crack |

INDUSTRIAL APPLICABILITY

The present invention is able to yield a superior effect of being able to provide a bonded body of a YAG ceramic and a YAG ceramic or a bonded body of a YAG ceramic and optical glass capable of suppressing light reflection at the bonded interface in which breakage will not occur easily even when there is a temperature change. The ceramic bonded body according to the present invention is useful in laser applications such as a high-power laser (amplifier).

DESCRIPTION OF REFERENCE NUMERALS 1 laser diode
2 excitation light
3 laser medium (core)
4 mirrors
5 laser
6 parasitic oscillation
7 light-absorbing layer (clad)

The invention claimed is:

1. A YAG ceramic bonded body for use in a laser application, wherein a YAG ceramic as a laser medium and a YAG ceramic or optical glass as a light-absorbing layer are bonded, excitation light is introduced from the light-absorbing layer placed around the laser medium, and laser is output in a direction that is vertical to an incident direction of the excitation light from the laser medium, wherein the YAG ceramic bonded body comprises glass as a bonding layer for bonding the laser medium and the light-absorbing layer, and has a rate of change of transmittance that is within 7%, wherein the glass as a bonding layer is selected from the group consisting of alkalisilicate-based glass material, aluminosilicate-based glass, borosilicate-based glass, germanosilicate-based glass, and bismuth borate-based glass.

2. The YAG ceramic bonded body according to claim 1, wherein the glass as the bonding layer has a refractive index of 1.71 to 1.91 relative to light having a wavelength of 650 nm.

3. The YAG ceramic bonded body according to claim 2, wherein the laser medium and light-absorbing layer are, respectively, Yb:YAG and Yb:YAG, Nd:YAG and Nd:YAG, Yb:YAG and Cr:YAG, or Yb:YAG and Sm:YAG.

4. The YAG ceramic bonded body according to claim 2, wherein the optical glass has a coefficient of thermal expansion of 7 to 9 ppm/K.

5. A method of producing the YAG ceramic bonded body according to claim 4, wherein the bonding layer as melted glass is coated on a surface of the laser medium, and the light-absorbing layer is bonded to the surface coated with the melted glass, and thereafter the melted glass is cooled.

6. A method of producing the YAG ceramic bonded body according to claim 3, wherein the bonding layer as melted glass is coated on a surface of one of the laser medium or light-absorbing layer, and the other of the laser medium or light-absorbing layer is bonded to the surface coated with the melted glass, and thereafter the melted glass is cooled.

7. A method of producing the YAG ceramic bonded body according to claim 2, wherein the bonding layer as melted glass is coated on a surface of one of the laser medium or light-absorbing layer, and the other of the laser medium or light-absorbing layer is bonded to the surface coated with the melted glass, and thereafter the melted glass is cooled.

8. A method of producing the YAG ceramic bonded body according to claim 1, wherein the bonding layer as melted glass is coated on a surface of one of the laser medium or light-absorbing layer, and the other of the laser medium or light-absorbing layer is bonded to the surface coated with the melted glass, and thereafter the melted glass is cooled.

9. The YAG ceramic bonded body according to claim 1, wherein the laser medium and light-absorbing layer are, respectively, Yb:YAG and Yb:YAG, Nd:YAG and Nd:YAG, Yb:YAG and Cr:YAG, or Yb:YAG and Sm:YAG.

10. A method of producing the YAG ceramic bonded body according to claim 9, wherein the bonding layer as melted glass is coated on a surface of the laser medium, and the light-absorbing layer is bonded to the surface coated with the melted glass, and thereafter the melted glass is cooled.

11. The YAG ceramic bonded body according to claim 1, wherein the optical glass has a refractive index of 1.71 to 1.91 relative to light having a wavelength of 650 nm, and has a coefficient of thermal expansion of 7 to 9 ppm/K.

12. A method of producing the YAG ceramic bonded body according to claim 11, wherein the bonding layer as melted glass is coated on a surface of one of the laser medium or light-absorbing layer, and the other of the laser medium or light-absorbing layer is bonded to the surface coated with the melted glass, and thereafter the melted glass is cooled.

* * * * *